(12) United States Patent
Marvasti

(10) Patent No.: US 9,058,259 B2
(45) Date of Patent: Jun. 16, 2015

(54) SYSTEM AND METHOD FOR DYNAMIC PROBLEM DETERMINATION USING AGGREGATE ANOMALY ANALYSIS

(75) Inventor: Mazda A. Marvasti, Rancho Santa Margarita, CA (US)

(73) Assignee: VMware, Inc., Palo Alto, CA (US)

( * ) Notice: Subject to any disclaimer, the term of this patent is extended or adjusted under 35 U.S.C. 154(b) by 176 days.

(21) Appl. No.: 12/242,153

(22) Filed: Sep. 30, 2008

(65) Prior Publication Data

US 2010/0083054 A1    Apr. 1, 2010

(51) Int. Cl.
*G06F 11/07* (2006.01)
*H04L 12/24* (2006.01)
*H04L 12/26* (2006.01)

(52) U.S. Cl.
CPC ........ *G06F 11/0751* (2013.01); *G06F 11/0709* (2013.01); *H04L 41/0681* (2013.01); *H04L 41/147* (2013.01); *H04L 43/16* (2013.01)

(58) Field of Classification Search
CPC ............ G06F 11/0709; G06F 11/0751; H04L 41/147; H04L 41/0681; H04L 43/16
USPC ......................................... 702/182–183, 185
See application file for complete search history.

(56) References Cited

U.S. PATENT DOCUMENTS

| | | | |
|---|---|---|---|
| 6,038,288 A * | 3/2000 | Thomas et al. ............ | 379/15.01 |
| 6,742,128 B1 * | 5/2004 | Joiner ............................. | 726/25 |
| 2003/0126255 A1 * | 7/2003 | Rice et al. ..................... | 709/224 |
| 2005/0021748 A1 * | 1/2005 | Garcea et al. ................. | 709/224 |
| 2006/0020924 A1 * | 1/2006 | Lo et al. ......................... | 717/127 |
| 2006/0176824 A1 * | 8/2006 | Laver et al. ..................... | 370/241 |
| 2006/0242282 A1 * | 10/2006 | Mullarkey ..................... | 709/223 |
| 2007/0254644 A1 * | 11/2007 | Dobson et al. ................ | 455/423 |
| 2008/0077358 A1 * | 3/2008 | Marvasti ...................... | 702/187 |

FOREIGN PATENT DOCUMENTS

EP     2166700 A1 *  3/2010

OTHER PUBLICATIONS

Leemis, Lawrence, "Relationships Among Common Univariate Distributions", May 1986, The American Statistician, vol. 40, No. 2, pp. 143-146.*

* cited by examiner

*Primary Examiner* — Mischita Henson

(57) ABSTRACT

A system and method are provided for determining problem conditions in an IT infrastructure using aggregate anomaly analysis. The anomalies in the metrics occurring in the monitored IT infrastructure are aggregated from all resources reporting metrics as a function of time. The aggregated metric anomalies are then normalized to account for the state of the monitored IT infrastructure to provide a normalized aggregate anomaly count. A threshold noise level is then determined utilizing a variably selectable desired level of confidence such that a problem event is only determined to likely be occurring in the IT infrastructure when the normalized aggregate anomaly count exceeds the threshold noise level. The normalized aggregate anomaly count is monitored against the threshold noise level as a function of time, such that a problem event in the IT infrastructure is identified when the normalized aggregate anomaly count exceeds the threshold noise level at a given time.

15 Claims, 7 Drawing Sheets

SYSTEM AND METHOD FOR DYNAMIC PROBLEM DETERMINATION USING AGGREGATE ANOMALY ANALYSIS

BACKGROUND

This disclosure relates generally to the field of information technology (IT) monitoring systems and, more particularly, to a system and method for determining problem conditions in an IT environment using aggregate anomaly analysis.

SUMMARY

According to one or more embodiments, a system and method are provided for determining problem conditions in an IT environment using aggregate anomaly analysis for use in automated intelligence. In one aspect, automated intelligence is a systems management paradigm that transforms raw metric data from resources in a monitored IT infrastructure into actionable intelligence. In one or more embodiments, the anomalies or abnormalities in the metric data that are occurring in the monitored IT infrastructure are aggregated from the collection of all resources reporting metrics as a function of time, where C(t) is the aggregate count of all active anomalies or abnormalities for metrics in the monitored IT infrastructure at time t. The aggregate metric anomalies C(t) are normalized to account for the state of the monitored IT infrastructure and the number of resources actually reporting metrics to provide a normalized aggregate anomaly count $C_n(t)$. In one or more embodiments, a threshold noise level $C_r$ is then determined such that a problem event is only identified as likely to be occurring in the IT infrastructure when the normalized aggregate anomaly count $C_n(t)$ exceeds the threshold noise level $C_r$. The threshold noise level $C_r$ may further be determined utilizing a variably selectable desired level of confidence that anomaly counts above this threshold level indicate that a problem event is likely to be occurring in the IT infrastructure. The normalized aggregate anomaly count $C_n(t)$ is monitored and compared against the threshold noise level $C_r$ as a function of time, such that a problem event in the IT infrastructure is identified when the normalized aggregate anomaly count $C_n(t)$ exceeds the threshold noise level $C_r$ at a given time. An alert may then be generated when such a problem event is identified to provide notification of the problem event. In this manner, only highly actionable alerts are generated when the aggregate metric anomalies in the monitored IT infrastructure exceed the threshold noise level $C_r$.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following detailed description of embodiments of the present disclosure, reference is made to the accompanying drawings in which like references indicate similar elements, and in which is shown by way of illustration specific embodiments or implementations in which the present disclosure may be practiced. These embodiments are described in sufficient detail to enable those skilled in the art to practice the present disclosure, and it is to be understood that other embodiments may be utilized and that logical, mechanical, electrical, functional, and other changes may be made without departing from the scope of the present disclosure. It is further understood that certain features of the various embodiments may be interchangeably used in the other embodiments described herein. The following detailed description is, therefore, not to be taken in a limiting sense, and the scope of the present disclosure is defined only by the appended claims. As used in the present disclosure, the term "or" shall be understood to be defined as a logical disjunction (inclusive of the term "and." "and").

Figure 1:
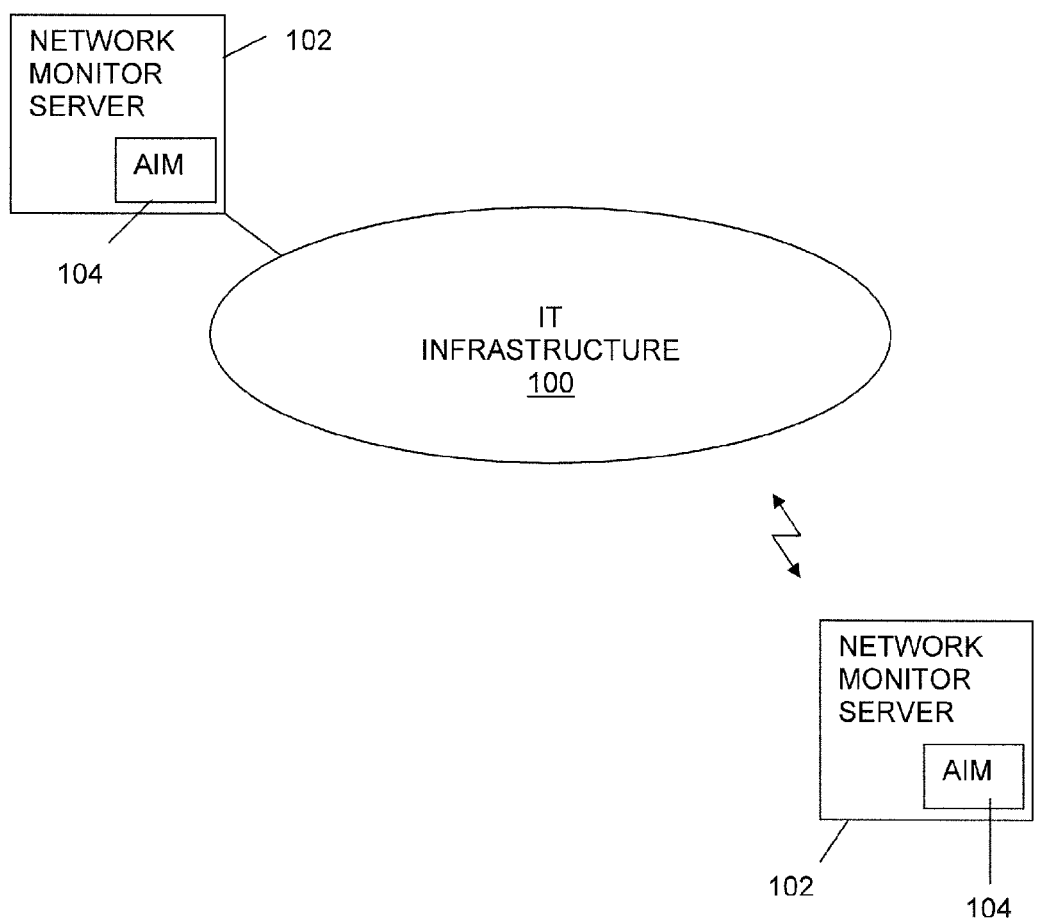
FIG. 1 is a schematic illustration of an exemplary network monitor server configuration of the dynamic problem determination system using aggregate anomaly analysis in accordance with one or more embodiments of the present disclosure.

In accordance with one or more embodiments, a novel system and method are provided for determining problem conditions in an IT environment using an analysis of aggregate anomalies in the IT environment. In one or more embodiments, the system and method for determining problem conditions in an IT environment using aggregate anomaly analysis is operational in special-purpose network monitor server 102 that monitors activity occurring on an IT infrastructure or data network 100, as illustrated in FIG. 1. The special-purpose network monitor server 102 includes an automated intelligence module (AIM) 104 installed and operating thereon for performing the functionality of the various methods, modules and algorithms described herein, including but not limited to an aggregate anomaly analysis module. The network monitor server 102 may be configured to be integral with the IT infrastructure 100, directly connected to communicate with the IT infrastructure 100 or configured to remotely communicate with the IT infrastructure 100.

Figure 2:
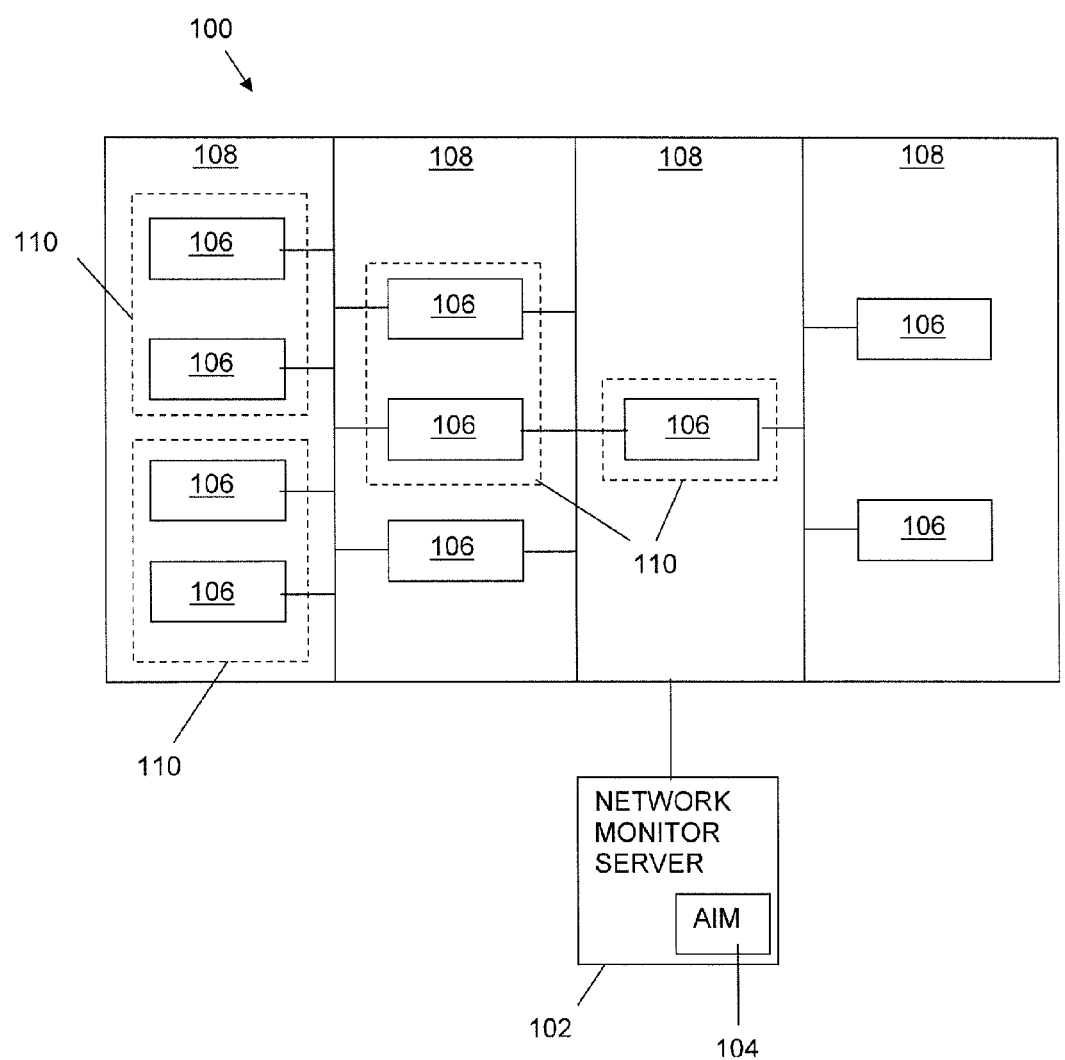
FIG. 2 is a representative IT infrastructure topology in accordance with one or more embodiments of the present disclosure.

In one or more embodiments, the IT infrastructure 100 may comprise a resource topology as illustrated in FIG. 2. A network consists of two or more computers or other devices that are linked in order to share resources (such as databases, servers, printers, applications, programs, etc.), exchange files, or allow electronic communications. The computers on a network may be linked together through a communication medium, such as cables, telephone lines, radio waves, satellites, infrared light beams, etc. There are many types of computer networks, including local-area networks (LANs), widearea networks (WANs), campus-area networks (CANs), metropolitan-area networks (MANs), home-area networks (HANs) and wireless networks. Networks are used to communicate between devices, such as via e-mail, and to provide access to resources stored on another device, such as a server. An IT infrastructure 100 comprises the computerized networks, intelligent terminals, and accompanying applications and services people use to access, create, disseminate, and utilize digital information. The IT infrastructure 100 also includes the equipment, software, services, and products used in storing, processing, transmitting, and displaying all forms of information.

Referring to the illustrative transaction topology shown in FIG. 2, the various computers, devices, intelligent terminals, applications, services, equipment, software, and products will collectively and independently be referred to as resources 106 of the IT infrastructure 100. In some embodiments, resources 106 may be grouped into tier groups 108 and sub-groupings of resources 110 that are respectively defined by the functions performed by the resources 106 contained within the respective tier groups 108 and sub-groupings of resources 110. For example, the different tier groups 108 could respectively identify an application server, a database server, an email server, a Citrix presentation server, etc. While it is possible to group the various resources 106 in this manner, it is not necessary in order to identify problems in the IT infrastructure 100 using the aggregate anomaly analysis described herein.

Organizations are increasingly dependent on their IT infrastructure for all of their essential business processes, which often depend on software, hardware, networks and data systems working together with full integrity to provide business functionality to external and internal users alike. Increasingly, "online" business processes are both critical to a company's well-being and based on distributed IT infrastructures of mounting complexity. The scope of the IT infrastructure 100 might even extend beyond the organization's boundaries into the infrastructures of partners and providers of managed services. IT infrastructures have conventionally been monitored by IT professionals that must manage an application infrastructure that is often a complex maze of loosely interconnected racks of servers, network components, and a multi-tiered stack of logical components including application servers, database servers, load balancers and the applications themselves. Each business process can depend on a chain of components drawn from that maze, yet the components are only managed as one of a number of similar components in a rack, "farm," or other logical silo. The result is "affordable" computing power, but at the cost of difficult-to-manage (and thus costly) system behavior.

In accordance with one or more embodiments, a novel system and method are provided for determining problem conditions in an IT infrastructure 100 using an analysis of aggregate anomalies in the IT infrastructure. The various resources 106 will be supplying or otherwise providing time-series metric data regarding their operation that can be utilized by the network monitor server 102 to identify problem events or conditions occurring in the IT infrastructure 100. Variations in the metric data often occur, such that network management systems and methods can be utilized to collect the metric information regarding the operation and performance of the IT infrastructure 100 and analyze the collected information to detect problems in the network. Problems can be identified by identifying at least one of a failure, a threshold violation by monitored metrics, a defined transaction or a user-identified occurrence in at least one resource and/or transaction in the IT infrastructure. One such method of performing dynamic thresholding calculations for identifying and predicting abnormalities by monitoring metrics in an IT infrastructure is described in U.S. Patent Publication No. 20080077358, entitled, "Self-Learning Integrity Management System and Related Methods," also invented by the present inventor and assigned to the same assignee as the present application, the contents of which are hereby incorporated by reference in its entirety. By way of example, one such dynamic thresholding determination may include a determination of a transaction slowdown on the IT infrastructure.

Figure 3:
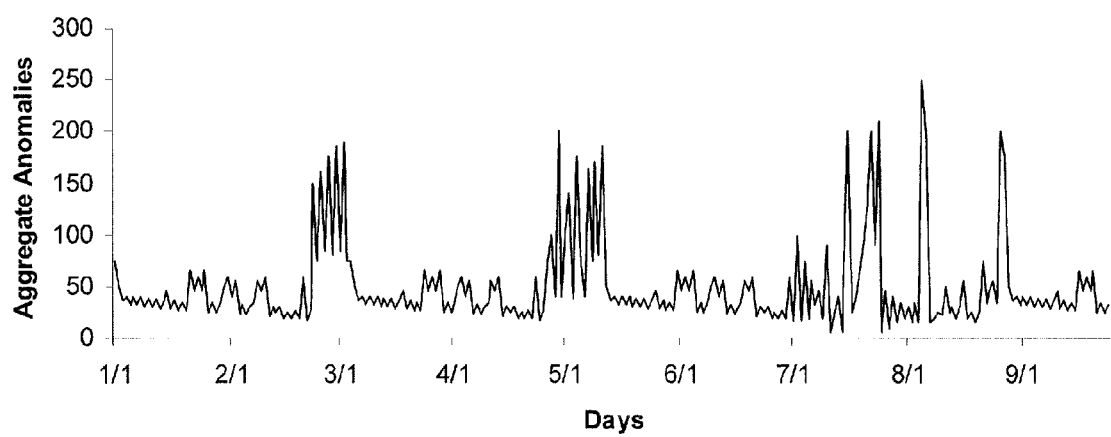
FIG. 3 is a representative graphical illustration showing the time series aggregate of metric anomalies in an IT infrastructure.

The difficulty in determining problem conditions in IT environments is often due to a lack of having appropriate understanding of the collected metrics and determining when conditions truly indicate that an abnormal behavior in a device, resource or transaction is present, such conditions will be referred to as abnormal events. Quite often, metrics from individual resources that cause the alerting of abnormal events (e.g., due to threshold violations by the individual metrics) do not actually constitute problem conditions in the IT infrastructure. Thus, IT professionals can be inundated with alerts of abnormal events occurring in the IT infrastructure, especially when a large number of resources 106 are present in the IT infrastructure 100. For example, referring to FIG. 3, a graphical illustration of an aggregation of all anomalies or abnormalities in metric data being supplied from resources 106 is provided for hypothetical network usage time-series data for an exemplary IT infrastructure 100. Due to the number of metric anomalies that consistently exist in an IT infrastructure 100, IT professionals can be overburdened and inefficiencies exist with respect to attempting to investigate each individual metric anomaly to identify which ones actually constitute problem conditions in the IT infrastructure 100.

Figure 4:
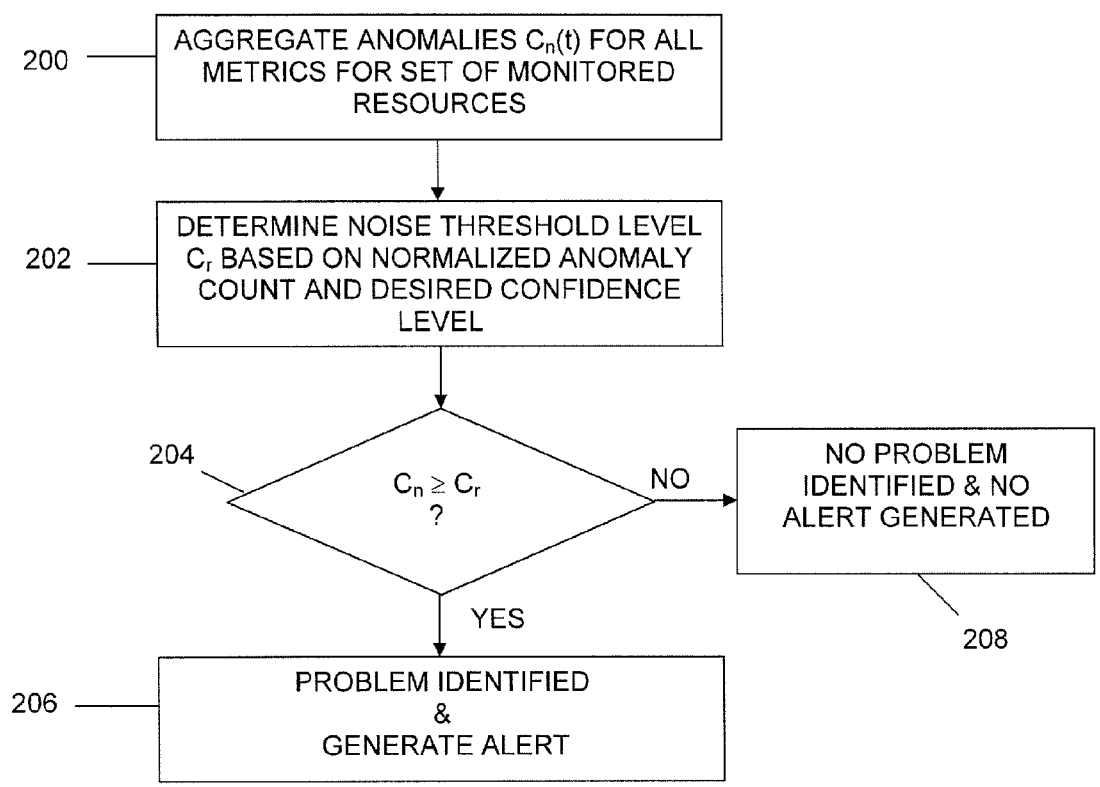
FIG. 4 is an operation flow diagram of a method for performing dynamic problem determination using aggregate anomaly analysis in accordance with one or more embodiments of the present disclosure.

In one or more embodiments, with reference to the operational flow diagram of FIG. 4, a method is provided for dynamically determining problem conditions in the IT infrastructure 100 by analyzing aggregated anomalies that are identified for the set of all monitored resources 106 in the IT infrastructure 100. In describing the algorithm followed by this method, a number of variable will be described and defined by the following:

R=the set of all resources 106 (e.g., servers, physical devices, applications, etc. from which metrics are being measured) being monitored in IT infrastructure 100;

$R_A(t)$=the set of resources 106 that are returning data at a given time t, where $R_A(t) \subseteq R$;

$M_i(t)$=count of metrics in resource $R_i \in R$; and

C(t)=count of all active anomalies or abnormalities (e.g., Dynamic Threshold violations as taught in U.S. Patent Publication No. 20080077358 or other abnormality determinations) for metrics in R at time t.

Initially, in operation 200, the anomalies or abnormalities in the metric data that are occurring in the monitored IT infrastructure 100 are aggregated from the collection of all resources $R_A(t)$ reporting metrics as a function of time to obtain an aggregated anomaly count C(t). The aggregated anomaly count C(t) is preferably adjusted to account for the state of the monitored IT infrastructure 100 and the number of resources 106 actually reporting metrics. The aggregated anomaly count C(t) may provide different degrees of confidence that a problem condition is present in the IT infrastructure 100 based on the state of the IT infrastructure 100. For instance, a specific aggregated anomaly count C(t) may provide a higher likelihood that a problem condition is present in the IT infrastructure 100 if only 5% of the set R of all resources 106 are reporting metrics as compared to if the same aggregated anomaly count C(t) exists when 80% of the set R of all resources 106 are reporting metrics.

Figure 5:
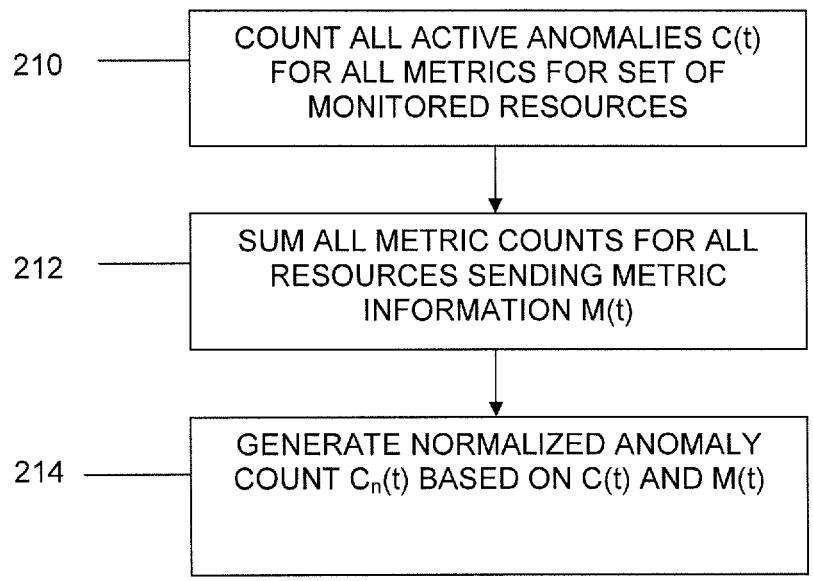
FIG. 5 is an operation flow diagram of a method for generating a normalized aggregate anomaly count in accordance with one or more embodiments of the present disclosure.

In one or more embodiments, the state of the IT infrastructure may be accounted for by normalizing the aggregated anomaly count C(t), as described with further reference to the operational flow diagram of FIG. 5. In operation 210, the count C(t) of all active anomalies or abnormalities for metrics in R at time t is obtained. In operation 212, the sum of metric counts M(t) for all resources 106 in $R_A(t)$ that are currently sending or otherwise providing metric data is determined, where:

$$M(t) \equiv \sum_{\forall i:\, R_i \in R_A(t)} M_i(t)$$

In operation 212, a normalized aggregate anomaly count $C_n(t)$ is then generated based on the aggregated anomaly count C(t) and the sum of metric counts M(t). In one or more embodiments, the normalized aggregate anomaly count $C_n(t)$ may be defined as:

$$C_n(t) \equiv \eta(t) \frac{\max\{C(t)\}}{\max\{\eta(t)\}}, \text{ where } \eta(t) \equiv \frac{C(t)}{M(t)}.$$

Using this definition, if M(t) is a constant, then $C_n(t)$ will equal the aggregated anomaly count C(t). However, in most practical situations, M(t) will vary with respect to time, thereby requiring the metric data to be normalized to ensure its values account for the state of the IT infrastructure 100.

Figure 6:
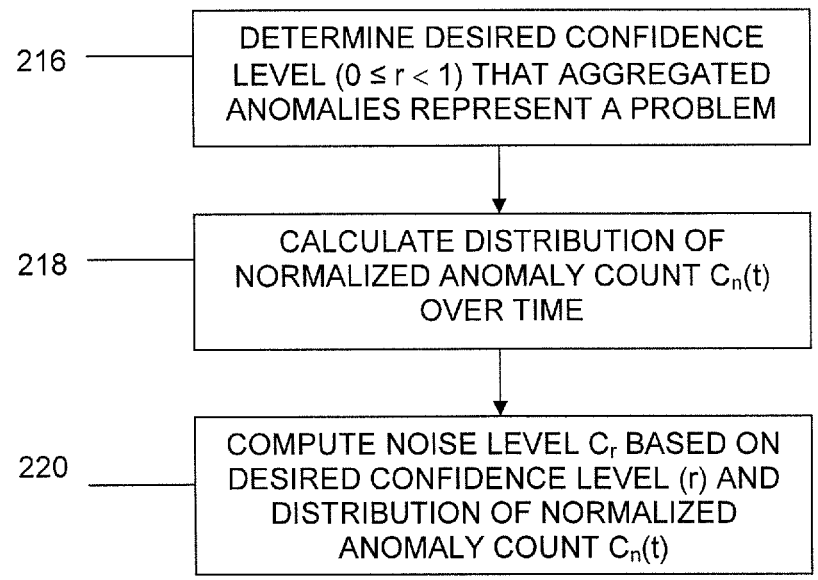
FIG. 6 is an operation flow diagram of a method for determining the threshold noise level $C_r$ for use in the dynamic problem determination procedures in accordance with one or more embodiments of the present disclosure.

Referring back to FIG. 4, after the normalized aggregate anomaly count $C_n(t)$ is obtained, a threshold noise level $C_r$ is then determined in operation 202 such that a problem event or condition is only identified as likely to be occurring in the IT infrastructure 100 when the normalized aggregate anomaly count $C_n(t)$ exceeds the threshold noise level $C_r$. The determination of the threshold noise level $C_r$ will be described with further reference to the operation flow diagram of FIG. 6.

In one or more embodiments, the threshold noise level $C_r$ is determined utilizing a variably selectable desired level of confidence (r) that aggregate anomaly counts above this threshold level indicate that a problem event is likely to be occurring in the IT infrastructure, where $0 \leq r < 1$. In this manner, an IT professional or user of the present system and method can set the level of confidence to indicate that they only want a problem condition to be identified if there exists a certain level of confidence that the value of the normalized aggregate anomaly count $C_n(t)$ indeed represents a problem condition. For example, the IT professional or user may only want problem conditions to be identified if there is a 75% likelihood, 95% likelihood or some other acceptable level of confidence that the value of the normalized aggregate anomaly count $C_n(t)$ indeed represents a problem condition. Thus, the level of confidence r is selected in operation 216. By defining the distribution of the normalized aggregate anomaly count $C_n(t)$ as p, the level of confidence r can be defined as:

$$\int_0^{C_r} p \times dC_n = r$$

The value for the level of confidence r ranges from zero to one, though never equaling to one. In all practical cases observed, the distribution of $C_n(t)$ exhibits strong exponential distribution behavior that is calculated in operation 218 and can be represented by the following:

$$p = \lambda e^{-\lambda C_n(t)}$$

$$\lambda^{-1} = \frac{1}{T} \int_{t_0}^{t_0+T} C_n(t) dt$$

where T represents the interval of interest that is being monitored in the IT infrastructure 100. The interval of interest T should be chosen to allow for enough data to be collected to compute accurate values for $\lambda$ and yet allow for quick change in the computed threshold noise level $C_r$ if changes in the data take place. For discrete data of N data sample, $\lambda$ can be represented as:

$$\lambda^{-1} = \frac{1}{N} \sum_{i=k}^{k+N} C_n(t_i),$$

where substituting this distribution into the equation for $C_r$ provides the following definition for the threshold noise level $C_r$ that is generated in operation 220:

$$C_r = -\frac{\ln(1-r)}{\lambda}$$

Referring back to FIG. 4, after the threshold noise level $C_r$ is determined, the normalized aggregate anomaly count $C_n(t)$ is monitored and compared against the threshold noise level $C_r$ as a function of time in operation 204. A problem event or condition in the IT infrastructure 100 is only then identified in operation 206 when the normalized aggregate anomaly count $C_n(t)$ exceeds the threshold noise level $C_r$ at a given time. An alert may then be generated when such a problem event or condition has been identified to provide notification of the problem event or condition. If the normalized aggregate anomaly count $C_n(t)$ is below the threshold noise level $C_r$, then no problem event or condition is identified, as represented by operation 208.

In this manner, only highly actionable alerts are generated when the normalized aggregate anomaly count $C_n(t)$ in the monitored IT infrastructure 100 exceed the threshold noise level $C_r$. In the various embodiments, an efficient process for identifying problem events or conditions in a monitored IT infrastructure 100 is provided, such that IT professionals are not inundated with numerous potential problem events for each individual metric anomaly that must be analyzed. Instead, only highly actionable problem events or conditions with a desired level of probability of existing must be investigated. Problem events or conditions are thus more likely to be more rapidly detected and able to be addressed using the present system and method for determining problem conditions in an IT environment using aggregate anomaly analysis. Further, the methodology of the present system and method will automatically determine when problems exist in IT infrastructures without the need for special instrumentation or tribal knowledge of the applications or systems in the datacenter.

Figure 7:
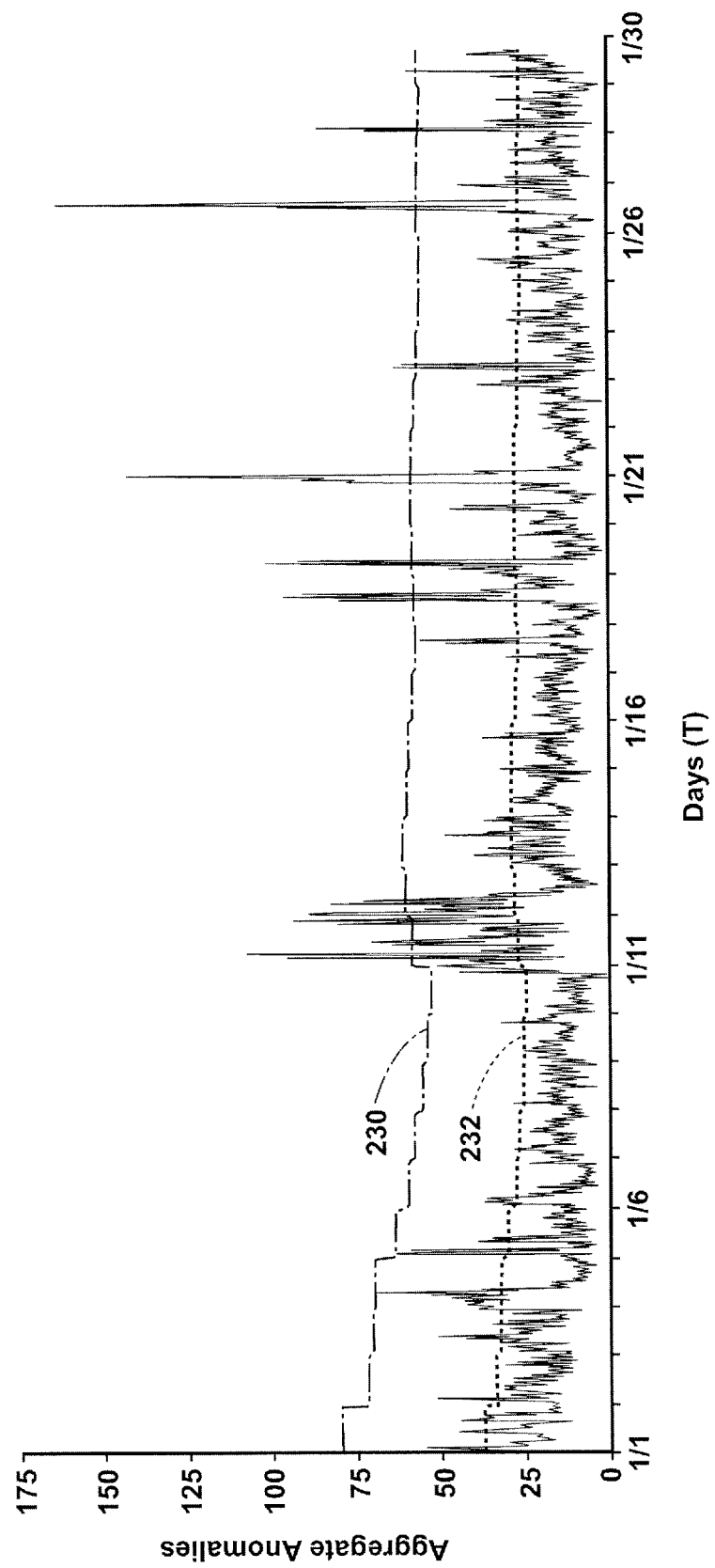
FIG. 7 is a representative graphical illustration showing aggregate anomaly counts and threshold noise levels $C_r$ as a function of time in accordance with one or more embodiments of the present disclosure.

To illustrate the utility of the methods of the present disclosure, hypothetical aggregate anomaly counts as a function of time for a representative IT infrastructure 100 are illustrated in the graphical illustration of FIG. 7 for a sample thirty day time interval. In the graph, two threshold noise levels $C_r$ are illustrated, where line 230 represents threshold noise level $C_r$ for r=0.95 and line 232 represents threshold noise level $C_r$ for r=0.75. Thus, normalized aggregate anomaly counts $C_n(t)$ at a given time t that exceeds line 230 will represent with a 95% likelihood that a problem event or condition exists at time t, while normalized aggregate anomaly counts $C_n(t)$ at a given time t that exceeds line 232 will represent with a 75% likelihood that a problem event or condition exists at time t. IT professionals or users can select the desired level of confidence that is most appropriate for the given IT infrastructure 100 or the given circumstances. In some embodiments, the threshold noise level $C_r$ can be based on a computation in which T is chosen to be variable so that the threshold noise level $C_r$ is computed for a specific time period (i.e., date) containing only data from that specific time period back to an original time period.

Figure 8:
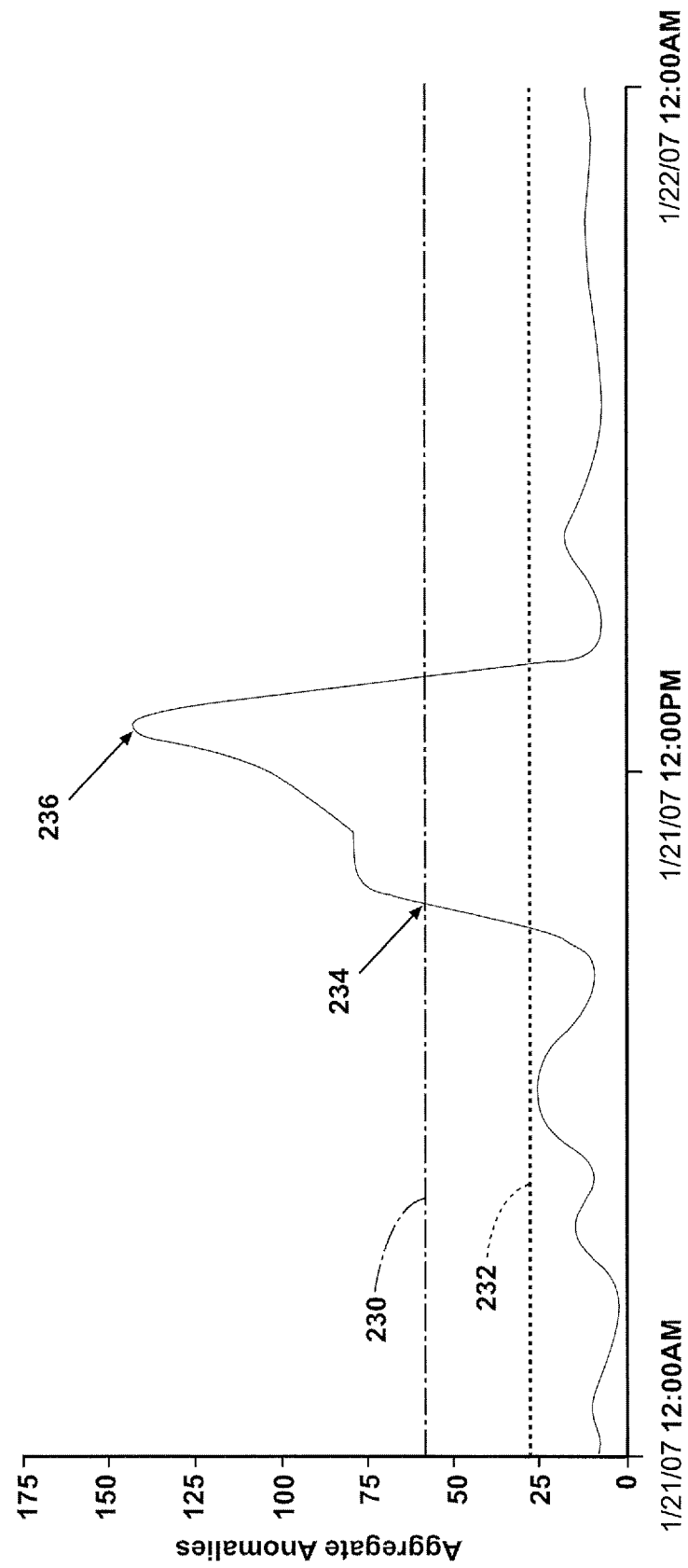
FIG. 8 is a close-up, limited time interval of the representative graphical illustration of FIG. 7.

Referring now to FIG. 8, a close-up of the day (e.g., January 21) on which a spike of a particularly high value of the normalized aggregate anomaly counts $C_n(t)$ that exceeds all threshold noise levels $C_r$ is illustrated. In this representative example, the data is obtained from a real world example in an IT environment in which a problem condition existed, such that the benefits of actually having used the present system and method to detect the problem condition will be described. As can be seen from the representative time period in this example, only one problem event would have been identified at the point 234 when the threshold noise level $C_r$ (for r=0.95) was exceeded, and thus only one alert would have been sent to a user at this time. Point 234 corresponds to 9:45 AM on January 21 in this example. Due to the volume of alerts that IT professionals or users typically get in response to individual metric anomalies, in this particular example it can be seen that corrective action was not taken until point 236 when the problem was actually identified at 12:45 PM on January 21. This corrective action did not take place until almost three hours after the problem would have been identified using the present system and method at the point in time when the aggregate anomalies exceeded the threshold noise level $C_r$ (for r=0.95). If the IT professional or user had been notified with a single alert of the identified problem condition at point 234 when the threshold noise level $C_r$ (for r=0.95) was exceeded, corrective actions could have been taken much earlier. Due to the volume of alerts that IT professionals or users typically receive in conventional systems that provide alerts based on individual metric anomalies, it is difficult for them to discern real problems from false positive alerts. Thus, often times, IT professionals or users will even ignore the alerts based on individual metric anomalies until real problems surface. The present system and method provides a highly actionable single alert that is generated in response to a desired level of confidence that a problem condition is actually present in the IT infrastructure based on the aggregate anomaly analysis described herein.

In various embodiments, the system and method is operational in an IT infrastructure or with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like. The system and method may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, the present system includes at least one central processing unit (CPU) or processor. The CPU can be coupled to a memory, ROM or computer readable media containing the computer-executable instructions for determining problem conditions in an IT environment using aggregate anomaly analysis. Computer readable media can be any available media that can be accessed by the system and includes both volatile and nonvolatile media, removable and non-removable media implemented in any method or technology for storage of information such as computer readable instructions, data structures, program modules or other data. Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the module for determining problem conditions in an IT environment using aggregate anomaly analysis. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media may store instructions and/or data which implement all or part of the system described herein.

In one embodiment, the system and method for determining problem conditions in an IT environment using aggregate anomaly analysis can be incorporated within J2EE and .NET based application that can be installed in any server environment, such a Windows or Linux server. In one aspect, the present system and method can act as an agentless system where no additional software is required to be installed on the monitored devices. Instead, the present system and method may collect relevant data and perform various system availability and performance tests by sending messages to the monitored systems in the form of ICMP pings, TCP/IP messages, commands over SSH terminal sessions, via Windows Management Instrumentation (WMI) methods and other known communication methods with devices in an IT infrastructure.

Many of the embodiments described herein will be directed toward automated intelligence of an IT infrastructure. However, it is the intention of the present inventors that the present system and method can be extended to other types of systems and models and to the analysis of other types of information in which aggregate anomalies of metric data can be assessed.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   determining an aggregated count of metric anomalies occurring in an information technology (IT) infrastructure, including obtaining a total count of all metric anomalies as a function of time for a set of resources supplying metric data that are being monitored on the IT infrastructure and adjusting the total count of all metric anomalies to produce the aggregated count of metric anomalies to account for the number of resources in the set of resources that are supplying metric data at a given time, the number of resources that are supplying the metric data being less than the number of resources in the set of resources;
   determining a threshold noise level for the aggregated count of metric anomalies above which a problem event is likely to be occurring in the IT infrastructure;
   identifying a problem event in the IT infrastructure when the aggregated count of metric anomalies exceeds the threshold noise level at a given time;
   issuing an alert when the problem event in the IT infrastructure is identified; and
   initiating a corrective action in response to the issued alert;
   wherein at least one of the determining the aggregated count of metric anomalies, the determining the threshold noise level and the identifying the problem event is executed by a processor.

2. The method of claim 1, wherein the total count of all metric anomalies is adjusted by determining a normalized anomaly count as a function of time based on a sum of metric counts for all the resources in the set of resources that are supplying the metric data.

3. The method of claim 1, further comprising determining the threshold noise level by:
   selecting a desired level of confidence that a problem event is likely to be occurring in the IT infrastructure when the aggregated count of metric anomalies exceeds the threshold noise level; and
   calculating the threshold noise level as a function of time based at least partially on the selected desired level of confidence.

4. The method of claim 3, further comprising calculating the threshold noise level as a function of a distribution of a normalized anomaly count over time.

5. The method of claim 1, further comprising refraining from issuing an alert when the aggregated count of metric anomalies fails to exceed the threshold noise level at a given time.

6. A non-transitory machine-readable medium having program instructions stored thereon executable by a processing unit of a special-purpose network monitoring server for performing the steps of:
   determining an aggregated count of metric anomalies occurring in an information technology (IT) infrastructure, including obtaining a total count of all metric anomalies as a function of time for a set of resources supplying metric data that are being monitored on the IT infrastructure and adjusting the total count of all metric anomalies to produce the aggregated count of metric anomalies to account for the number of resources in the set of resources that are supplying metric data at a given time, the number of resources that are supplying the metric data being less than the number of resources in the set of resources;
   determining a threshold noise level for the aggregated count of metric anomalies above which a problem event is likely to be occurring in the IT infrastructure;
   identifying a problem event in the IT infrastructure when the aggregated count of metric anomalies exceeds the threshold noise level at a given time;
   issuing an alert when the problem event in the IT infrastructure is identified; and
   initiating a corrective action in response to the issued alert.

7. The non-transitory machine-readable medium of claim 6, further comprising program instructions stored thereon for adjusting the total count of all metric anomalies by determining a normalized anomaly count as a function of time, the normalized anomaly count being based on a sum of metric counts for all the resources in the set of resources that are supplying the metric data.

8. The non-transitory machine-readable medium of claim 6, further comprising program instructions stored thereon for determining the threshold noise level by:
   selecting a desired level of confidence that a problem event is likely to be occurring in the IT infrastructure when the aggregated count of metric anomalies exceeds the threshold noise level; and
   calculating the threshold noise level as a function of time based at least partially on the selected desired level of confidence.

9. The non-transitory machine-readable medium of claim 8, further comprising program instructions stored thereon for calculating the threshold noise level as a function of a distribution of a normalized anomaly count over time.

10. A system comprising:
    means for determining an aggregated count of metric anomalies occurring in an information technology (IT) infrastructure, including obtaining a total count of all metric anomalies as a function of time for a set of resources supplying metric data that are being monitored on the IT infrastructure and adjusting the total count of all metric anomalies to produce the aggregated count of metric anomalies to account for the number of resources in the set of resources that are supplying metric data at a given time, the number of resources that are supplying the metric data being less than the number of resources in the set of resources;
    means for determining a threshold noise level for the aggregated count of metric anomalies above which a problem event is likely to be occurring in the IT infrastructure;
    means for identifying a problem event in the IT infrastructure when the aggregated count of metric anomalies exceeds the threshold noise level at a given time;
    means for issuing an alert when the problem event in the IT infrastructure is identified; and
    means for initiating a corrective action in response to the issued alert.

11. The system of claims 10, wherein the means for determining the aggregated count of metric anomalies is further configured for adjusting the total count of all metric anomalies by determining a normalized anomaly count as a function of time, the normalized anomaly count being based on a sum of metric counts for all the resources in the set of resources that are supplying the metric data.

12. The system of claim 10, wherein the means for determining the threshold noise level is further configured for:
- selecting a desired level of confidence that a problem event is likely to be occurring in the IT infrastructure when the aggregated count of metric anomalies exceeds the threshold noise level; and
- calculating the threshold noise level as a function of time based at least partially on the selected desired level of confidence.

13. The system of claim 12, wherein the means for determining the threshold noise level is further configured for calculating the threshold noise level as a function of a distribution of a normalized anomaly count over time, wherein the distribution is represented by:

$$p = \lambda e^{-\lambda C_n(t)}$$
$$\lambda^{-1} = \frac{1}{T} \int_{t_0}^{t_0+T} C_n(t) dt,$$

where T represents a time interval of interest and $C_n(t)$ represents the normalized anomaly count.

14. The system of claim 10, further comprising means for refraining from issuing an alert when the aggregated count of metric anomalies fails to exceed the threshold noise level at a given time.

15. The system of claim 11, wherein the means for determining the aggregated count of metric anomalies is further configured determine the normalized anomaly count as a function of time, wherein the normalized count is represented by:

$$C_n(t) \equiv \eta(t) \frac{\max\{C(t)\}}{\max\{\eta(t)\}},$$

wherein $$\eta(t) \equiv \frac{C(t)}{M(t)},$$

C(t) is the total count of all metric anomalies and M(t) is the sum of metric counts for all the resources in the set of resources that are supplying the metric data.

* * * * *